July 17, 1923.

W. G. LERCH

TIRE CONSTRUCTION

Filed June 22, 1921

1,462,453

INVENTOR.
William G. Lerch
BY
ATTORNEY.

Patented July 17, 1923.

1,462,453

UNITED STATES PATENT OFFICE.

WILLIAM G. LERCH, OF AKRON, OHIO, ASSIGNOR TO THE INDIA TIRE & RUBBER COMPANY, OF MOGADORE, OHIO, A CORPORATION OF OHIO.

TIRE CONSTRUCTION.

Application filed June 22, 1921. Serial No. 479,500.

*To all whom it may concern:*

Be it known that I, WILLIAM G. LERCH, a citizen of the United States, residing at Akron, county of Summit and State of Ohio, have invented certain new and useful Improvements in Tire Constructions, of which the following is a specification.

In the ordinary and commonly practised methods of building pneumatic tires, it is customary to place immediately below the tread portion of the tire and between the tread and the cushion, a layer of fabric which is known in the art as the "breaker strip". The purpose and function of this breaker strip is the subject of some question in the art, but it seems to be an essential feature in the manufacture of tires. The "breaker strip" is, in the ordinary and commonly practised construction, a strip of loosely woven fabric laid about the periphery of the tire, having been first coated or saturated with an adhesive rubber compound. It serves to unite the tread to the cushion and thus to the carcass of the tire and it also serves additional functions in transmitting and distributing the blows from the tread of the tire to the carcass in such a way that the impacts received in the service are distributed over a wider area of the carcass and ply separation is prevented. The breaker also serves in a way to transmit the torque from the tread of the tire to the body thereof and increase the adhesion between the tread and the remainder of the tire so that tread separation is prevented.

As stated above, the ordinary form of breaker strip is a loosely woven, open mesh fabric, composed of heavy threads or cords woven at right angles to each other. The "breaker strip" has little strength of its own and therefore, under stress and strain may, and often does allow the cushion to roll up and by generating frictional heat to disintegrate, and while it performs its functions as set forth above, in a more or less satisfactory way, I have found that a radically different and novel form of breaker strip will perform the functions of the old breaker strip in much better fashion than formerly obtained and will possess additional advantages. For this purpose I have devised a "breaker strip" in which there are contained a plurality of parallel cords without any substantial cross threads, which cords may be arranged in a single layer or a plurality of layers in the position of the "breaker strip", the cords in the adjacent layers, if more than one is used, being arranged at right angles to each other. In this way the tread is united to the body of the tire, the cords having great strength across the periphery of the tire, whereas the ordinary "breaker strip" has but very little, the blows are transmitted and distributed and the torque is transmitted in an entirely different manner than has been present in tires constructed with the old form of "breaker strip". The tread is more securely fastened to the cushion and tread separation is prevented, because of the new form of fabric insert which replaces the "breaker strip", because it possesses considerable strength and for other reasons, it therefore adds to the service of the tire.

In the drawings accompanying this application, there is shown one form of my invention, it being understood that when the principles thereof have been explained, there may be other forms in which the invention can be carried out and I am not limited to the exact construction shown.

Figure 1:
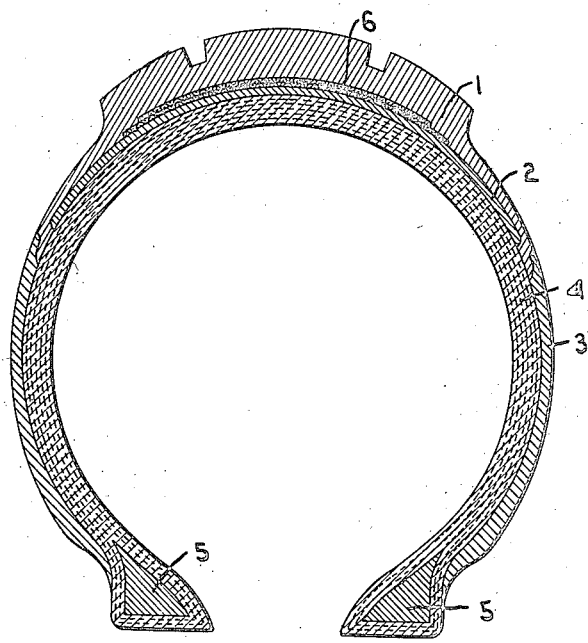
Fig. 1 is a cross section of a tire constructed in accordance with my invention, having the improved fabric insert to replace the "breaker strip".
Figure 2:
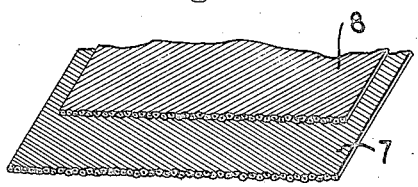
Fig. 2 is a fragmentary view of the breaker, broken away to show the construction.

A tire of the usual construction, except insofar as my improvements have been applied thereto, is shown in Fig. 1, in which the tread is indicated by the numeral 1, the cushion by the numeral 2, side walls at 3, the carcass or body of the tire at 4 and the beads at 5. The body of the tire is formed by a plurality of layers of rubberized fabric of any preferred type, and the cushion 2 is a layer of high grade resilient gum placed around the periphery of the tire and between the carcass of the tire and the tread.

The fabric insert 6 is shown at the point usually occupied by the common "breaker strip". The fabric insert or "breaker strip" is preferably composed of two layers of parallel cords 7 and 8, the cords in the two layers being arranged diagonally with respect to the plane of the tire but at right angles with respect to each other, whereby they form two layers of parallel cords, at angles to each other, but not intersecting. The cords for this purpose may be obtained by the use of the ordinary cord tire fabric which comprises parallel cords arranged closely together and held in position by minute crossing threads arranged at spaced intervals in the cords which threads serve merely to hold the cords in position. By arranging the cords in parallel relation as has been described, no friction is developed in the fabric insert during the running of the tire. While the diagonal positioning of the cords is preferred, other arrangements may be used, the angle of the cords being maintained so that traction or torque will be transmitted by them from the tread to the carcass of the tire.

Preparatory to assembling in the tire, the cords constituting the fabric insert are thoroughly saturated and coated with a rubber compound, so that they are completely embedded and surrounded therein and the two layers of cords are separated from each other by the coating of rubber. The outer of the two layers may be slightly narrower than the inner layer as shown in the drawing, although this is not essential.

It has been found that tires made with the new form of fabric insert described herein, give remarkably better results than can be obtained by the use of the old form of breaker strip. The tread is securely held to the body of the tire and does not separate as often happens with the old form of "breaker strip". Ply separation is avoided and increased mileage is obtained and the "breaker strip" adds to the strength of the tire.

Claims:
1. A tire construction comprising, a carcass composed of a plurality of layers of rubberized fabric, a layer of rubber of a highly resilient character constituting a cushion, an outer layer of tougher rubber constituting a tread, and a layer of cords interposed between the cushion and tread, said last named layer being composed of a plurality of parallel cords arranged in close relation to one another and extending in a diagonal position with respect to the central plane of the tire, whereby traction is transmitted from the tread to the carcass without generating friction within the cords and without restricting the circumferential contraction or expansion of the tire casing.

2. A tire construction comprising, a carcass composed of a plurality of layers of rubberized fabric, a layer of rubber of a character to constitute a cushion over the carcass, a layer of tread rubber over the cushion, and two layers of parallel cords 7 and 8 interposed between the tread and the cushion, said cord layers being arranged as shown and described with the cords in oppositely arranged diagonal positions with respect to the central plane of the tire, whereby the functions of a breaker strip are performed by the layers of cords without frictional engagement of the cords with one another, without loss of traction between the tread and the carcass, and without restriction of the circumferential contraction or expansion of the tire.

WILLIAM G. LERCH.